A. E. COOK & S. E. KURTZ.
MOTOR DRIVEN AGRICULTURAL APPARATUS.
APPLICATION FILED JAN. 5, 1906.

1,010,238.

Patented Nov. 28, 1911.

12 SHEETS—SHEET 1.

INVENTORS
Albert E. Cook
Samuel E. Kurtz
BY
Munn & Co.
ATTORNEYS

WITNESSES

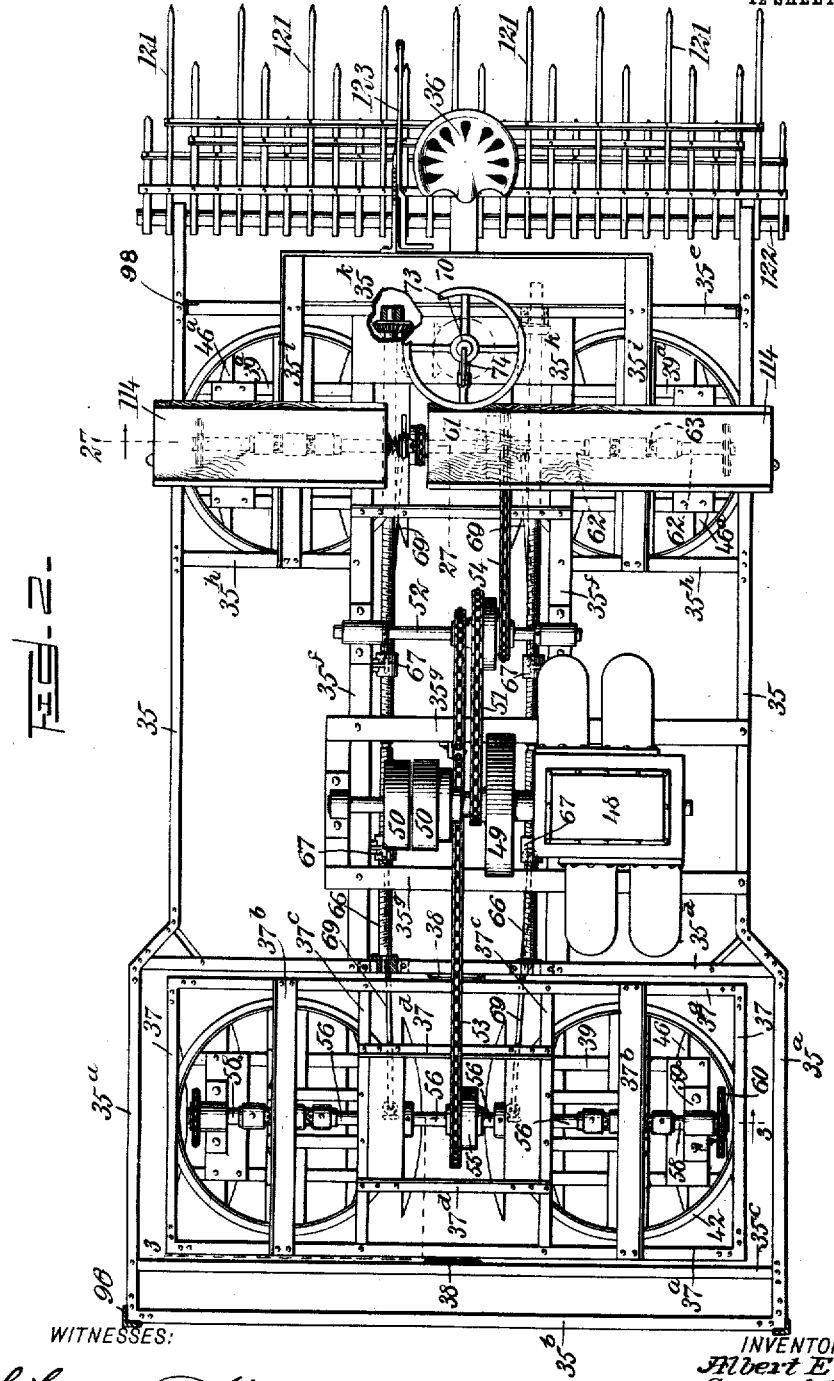

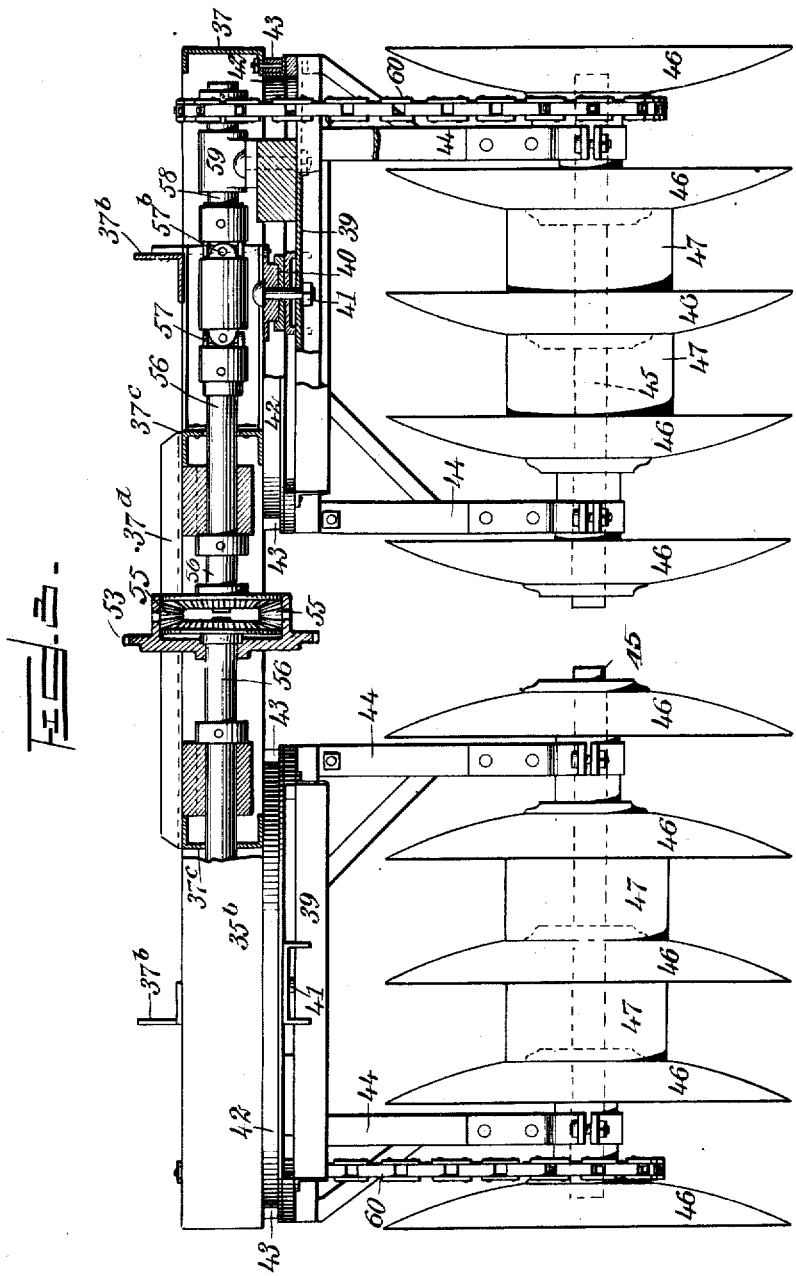

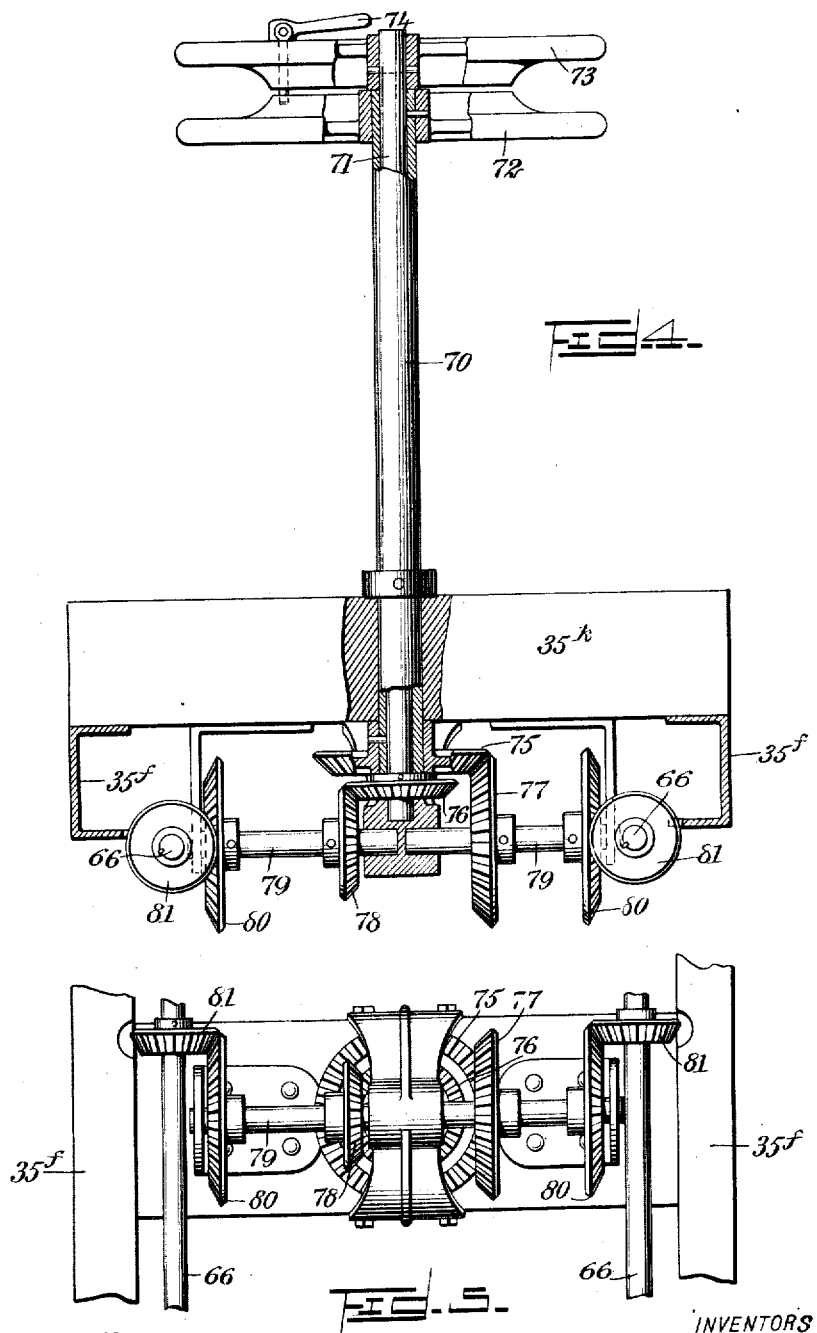

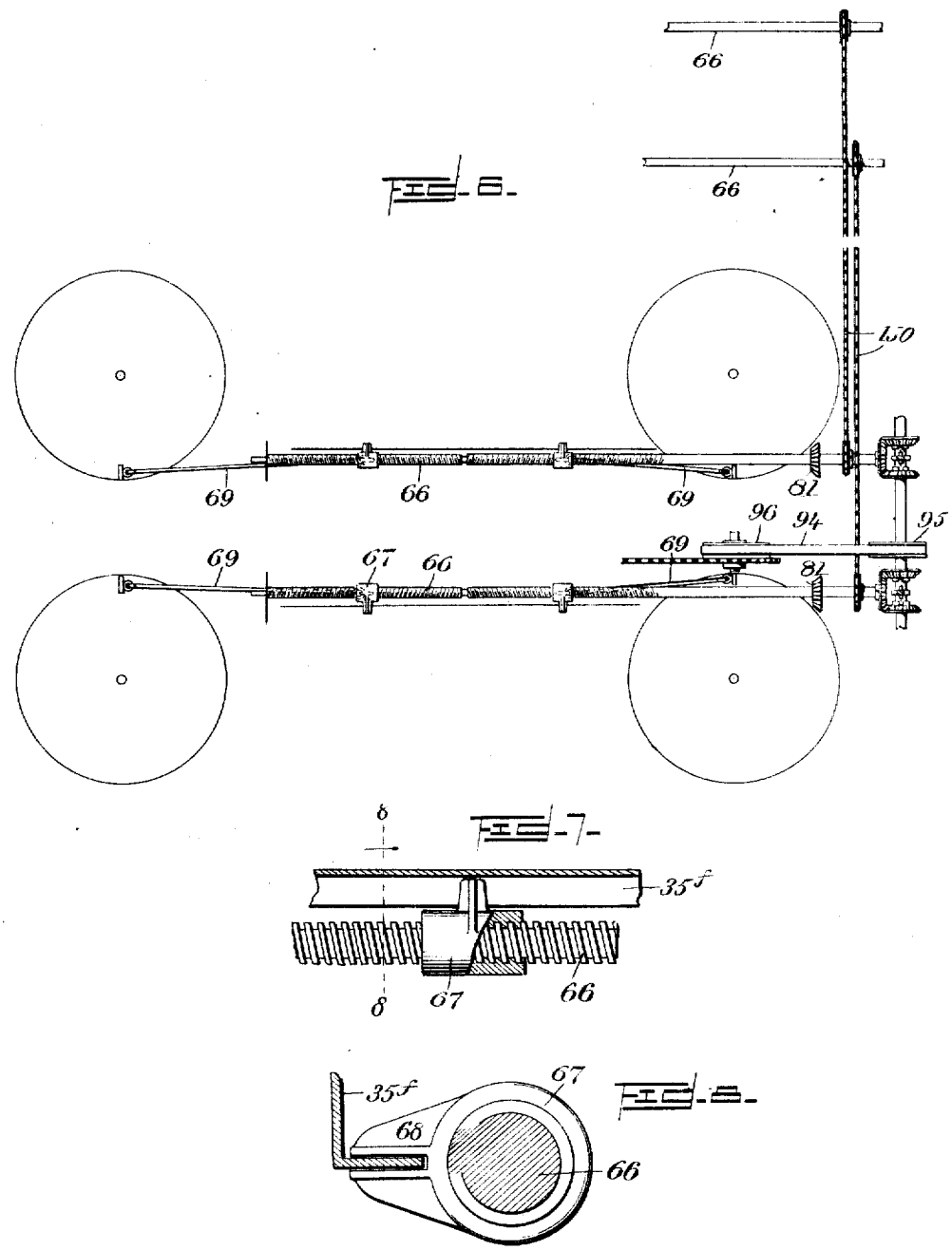

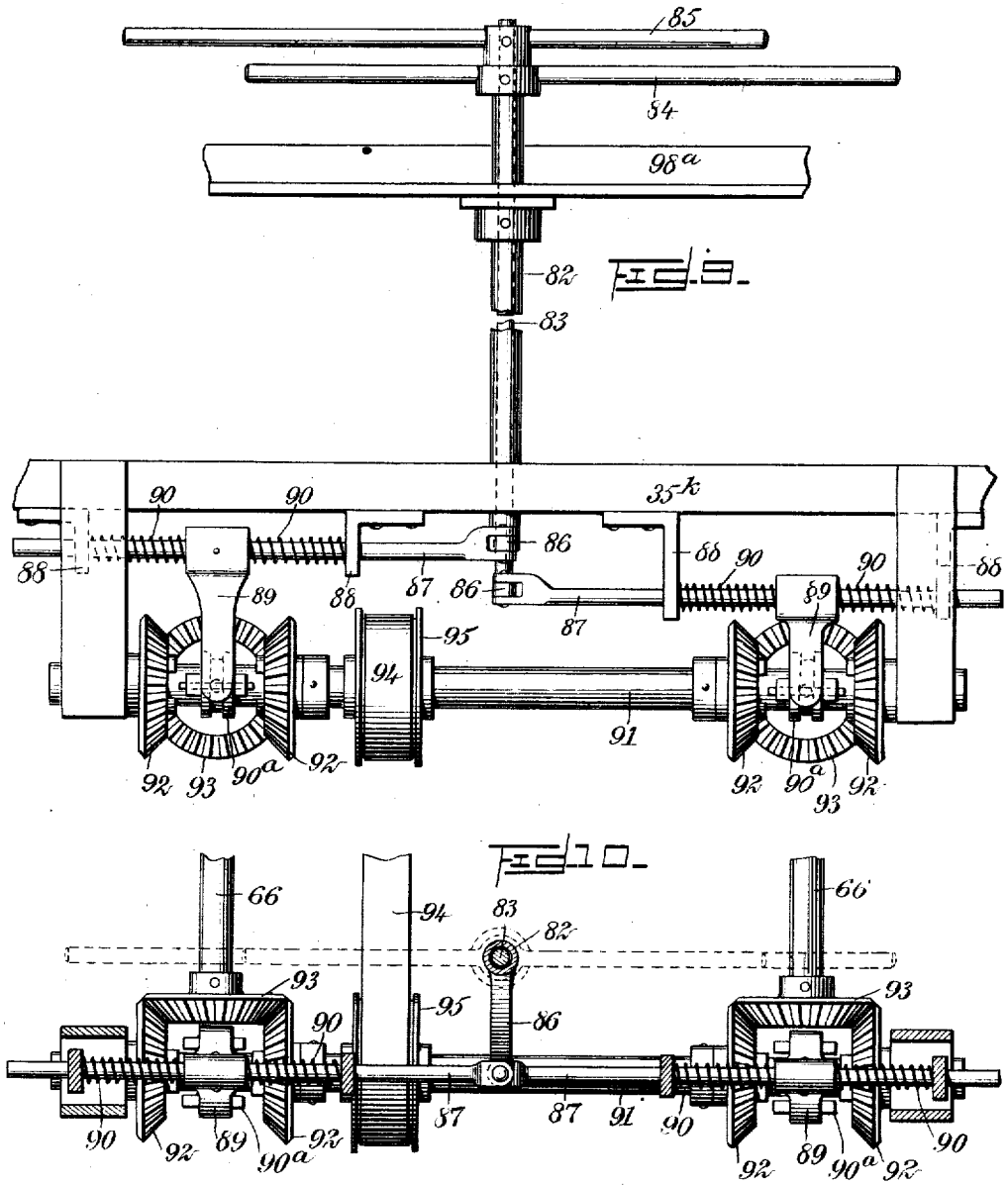

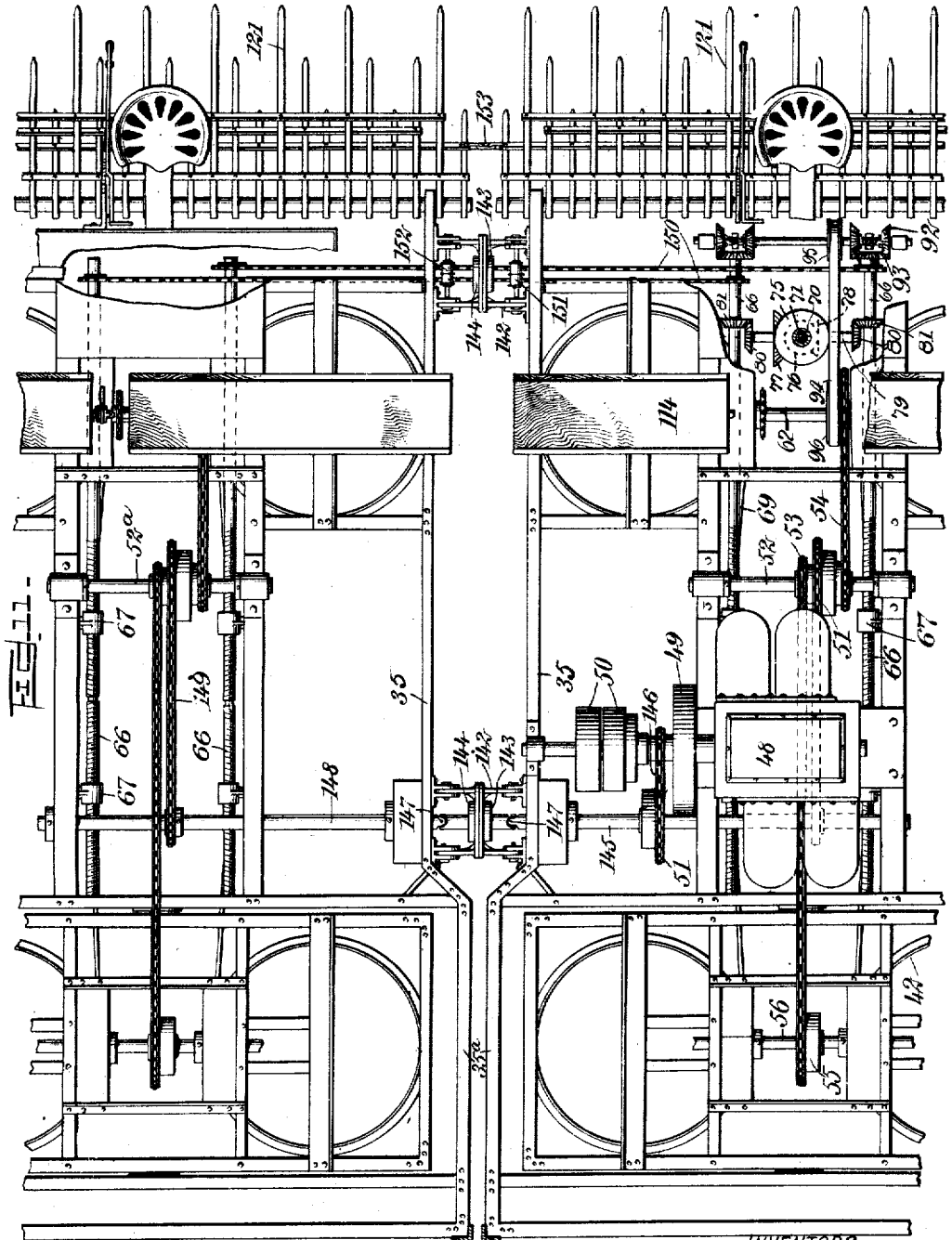

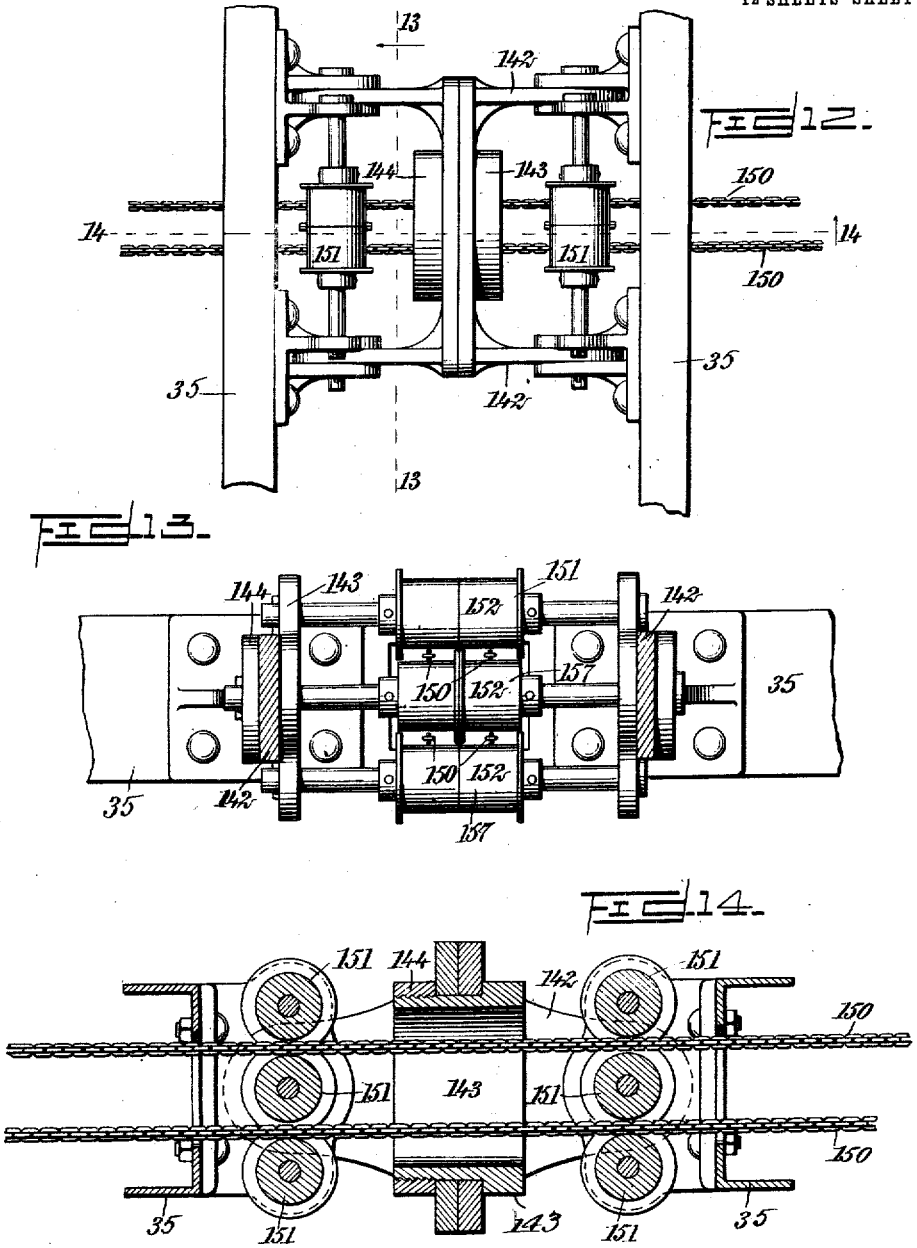

A. E. COOK & S. E. KURTZ.
MOTOR DRIVEN AGRICULTURAL APPARATUS.
APPLICATION FILED JAN. 5, 1906.
1,010,238.
Patented Nov. 28, 1911.
12 SHEETS—SHEET 9.
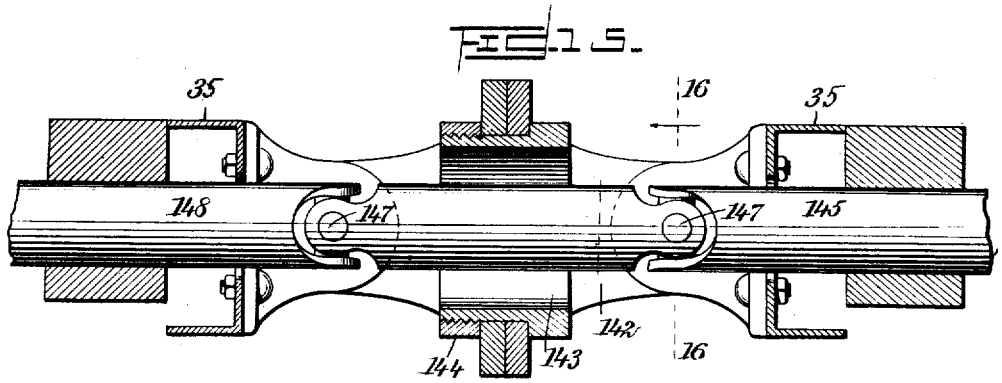
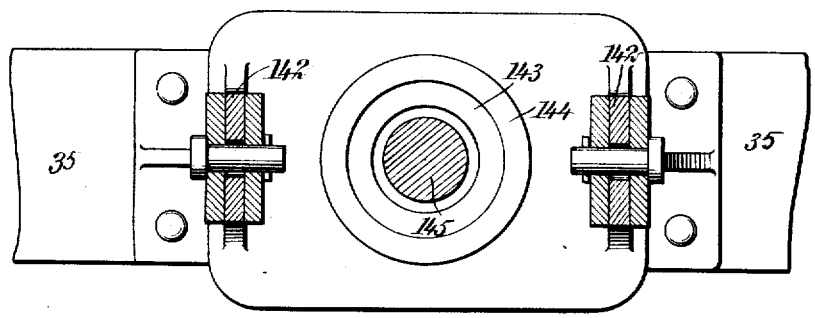

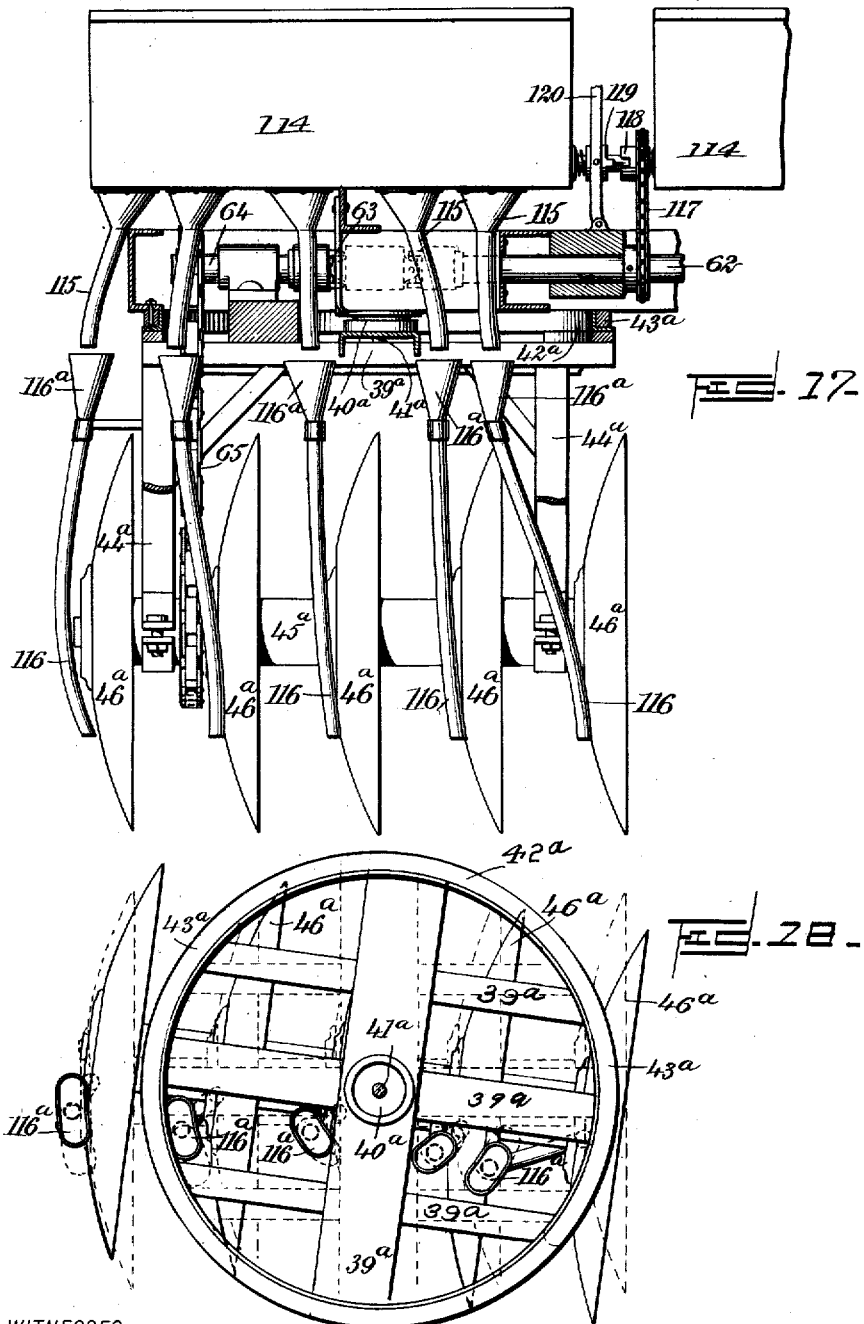

A. E. COOK & S. E. KURTZ.
MOTOR DRIVEN AGRICULTURAL APPARATUS.
APPLICATION FILED JAN. 5, 1906.
1,010,238.
Patented Nov. 28, 1911
12 SHEETS—SHEET 11.
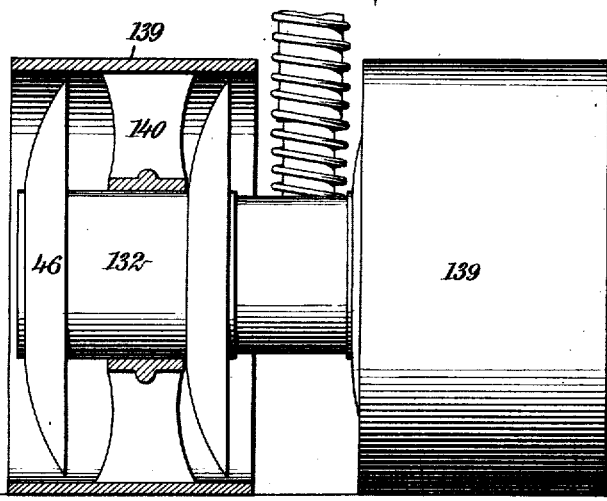
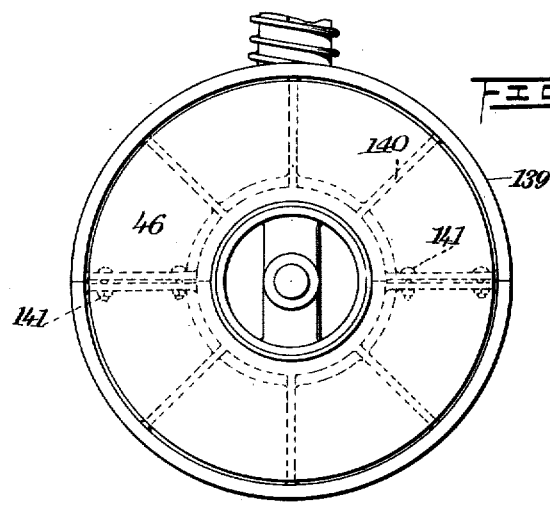
WITNESSES:
INVENTORS
Albert E. Cook
Samuel E. Kurtz
BY
ATTORNEYS A. E. COOK & S. E. KURTZ.
MOTOR DRIVEN AGRICULTURAL APPARATUS.
APPLICATION FILED JAN. 5, 1906.
1,010,238.
Patented Nov. 28, 1911.
12 SHEETS—SHEET 12.
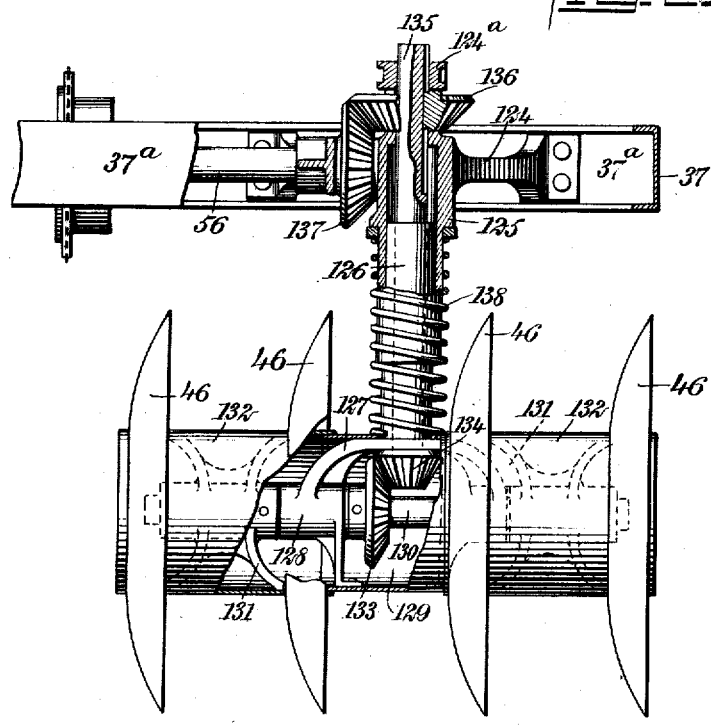
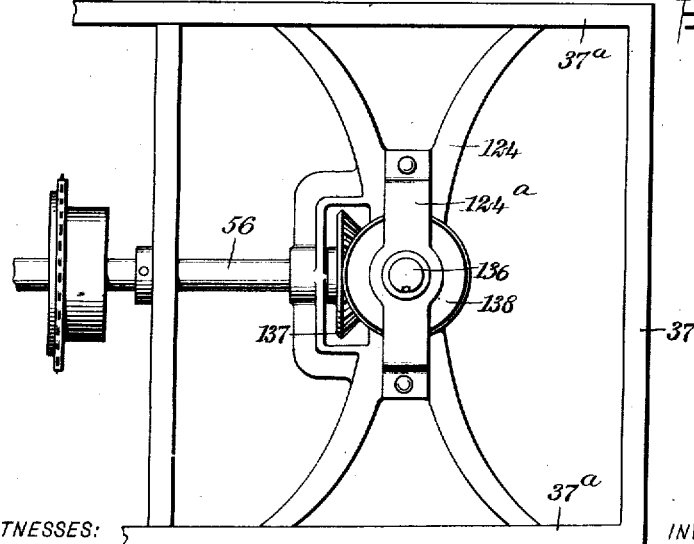

UNITED STATES PATENT OFFICE.

ALBERT E. COOK AND SAMUEL E. KURTZ, OF ODEBOLT, IOWA, ASSIGNORS TO THE INTERNATIONAL MOTOR PLOW COMPANY, OF CHICAGO, ILLINOIS, A CORPORATION OF SOUTH DAKOTA.

MOTOR-DRIVEN AGRICULTURAL APPARATUS.

1,010,238.  Specification of Letters Patent.  Patented Nov. 28, 1911.

Application filed January 5, 1906. Serial No. 294,732.

*To all whom it may concern:*

Be it known that we, ALBERT E. COOK and SAMUEL E. KURTZ, both citizens of the United States, and residents of Odebolt city, in the county of Sac and State of Iowa, have invented a new and Improved Motor-Driven Agricultural Apparatus, of which the following is a full, clear, and exact description.

The invention relates to certain improvements over the prior patent to Samuel E. Kurtz, Serial Number 781,214, dated January 31, 1905, and our prior patent, Serial Number 789,528, dated May 9, 1905, disclosing machines in which an engine is mounted on the frame of the apparatus and geared with peculiarly arranged combined cultivating and propelling tools supporting the apparatus, cultivating the earth, and propelling the apparatus over the same.

The essential object of our present invention is to simplify the construction and organization of the apparatus, rendering the same better suited to practical operations, and better capable of enduring the strains necessarily imposed upon it.

A further object is to improve the arrangement and manner of mounting and driving the rotating cultivating and propelling tools.

It is also an object of our invention to provide both manual and power actuated steering means, enabling the apparatus to be steered or guided easily and accurately.

A further object is to provide for operating the apparatus in multiple, two or more being coupled together and driven by a single engine, or by an engine on each apparatus as desired.

Our invention contemplates various other objects of major or minor importance, and all will be fully set forth hereinafter.

To these ends our invention resides in certain novel features of construction and combinations of parts, which will be fully set forth hereinafter and particularly pointed out in the claims.

Reference is to be had to the accompanying drawings which illustrate as an example the preferred embodiment of our invention, in which drawings—

Figure 1 is a side view of the apparatus; Fig. 2 is a plan view of the same; Fig. 3 is a front elevation with parts in section on the line 3—3 of Fig. 2; Fig. 4 is a sectional elevation of the hand steering devices, and illustrating the gearing connected therewith for driving the steering screws; Fig. 5 is a bottom plan view of said gearing; Fig. 6 is a diagrammatic view illustrating the steering gear with the power driving devices, and also showing the manner of connecting the steering gear of one apparatus with that of the second when two apparatus are used together; Fig. 7 is an enlarged detail showing one of the nuts which are actuated by the steering screws; Fig. 8 is a sectional elevation on the line 8—8 of Fig. 7; Fig. 9 is a rear elevational view showing the power steering levers and the gear actuated thereby; Fig. 10 is a plan view of said gear; Fig. 11 is a plan view showing the two apparatus coupled together, and illustrating the arrangement which is followed in case the second apparatus is driven by the engine of the first; Fig. 12 is an enlarged plan view of the rear coupling employed in Fig. 11; Fig. 13 is a sectional elevation thereof on the line 13—13 of Fig. 12; Fig. 14 is a sectional elevation on the line 14—14 of Fig. 12; Fig. 15 is an enlarged detail showing the forward coupling employed in Fig. 11, and illustrating the drive shaft passing through the same; Fig. 16 is a section on the line 16—16 of Fig. 15; Fig. 17 is a fragmentary elevation showing the seeding attachment with parts in section on the line 27—27 of Fig. 2; Fig. 18 is a fragmentary plan illustrating the operation of the seeding attachment in connection with the adjustment of the cultivating and propelling tools; Fig. 19 is an enlarged detail showing an attachment by which to convert the apparatus into a roller; Fig. 20 is an end view of the construction shown in Fig. 19; Fig. 21 is a sectional view of a modified arrangement for mounting the frame on the propelling and cultivating tools; and Fig. 22 is a plan view of the same.

As shown in Figs. 1 and 2, the apparatus has a rigid main framing which is composed principally of side rails 35, having off-set portions 35ᵃ at their front ends to facilitate coupling two machines together, as will hereinafter fully appear. The side rails 35 are connected by cross beams 35ᵇ, 35ᶜ, 35ᵈ and 35ᵉ, which extend continuously across between the side rails 35. Located in the center of the machine are longitudinal beams or rails 35ᶠ which support the engine bed 35ᵍ. Cross members 35ʰ connect the central members 35ᶠ with the side members 35, and said cross members 35ʰ support longitudinal frame members 35ⁱ which are fastened to the parts 35ʰ and 35ᵉ, and which together with the parts 35ᶠ sustain a platform 35ᵏ just rearward of which the seat 36 for the driver is mounted. In an opening formed in the widened front framing of the apparatus is located the auxiliary front frame which is rectangular in form, having side members 37 joined by transverse members 37ᵃ, reinforced by intermediate braces 37ᵇ, and a central bracing composed of longitudinal members 37ᶜ connected by cross members 37ᵈ. This frame is pivotally mounted to rock on the main frame around an axis extending longitudinally of the machine by means of trunnions and sockets 38 which are carried respectively on the parts 37ᵃ and 35ᶜ and 35ᵈ.

The auxiliary front frame as shown best in Fig. 3 supports two independently adjustable groups of rotating cultivating and propelling tools. Each group of tools is carried on a frame 39 which is pivotally connected through a central pin and socket 40 and a king bolt 41 with the auxiliary front frame. The cultivating tool frames are provided with guide rings or fifth wheel sections 42 securely fastened to the frames and adapted to engage short segmental rails or shoes 43 secured to the under side of the auxiliary front frame. By means of these devices, therefore, the cultivating tool frames are arranged to turn around the centers of the pins 41, this turning movement being guided and the parts being steadied by the engagement of the elements 42 and 43, and at the same time both gangs of cultivating tools are free to rock around the center of the trunnion 38 bodily with the auxiliary front frame. Depending from the cultivating tool frames 39 are hangers 44, in which are revolubly mounted the shafts 45 carrying cultivating and propelling tools 46. These tools are in the form of concavo-convex disks, and, as best shown in Fig. 1, are formed with rounding undulatory edges, which formation is best adapted to a thorough and easy cutting of brush, sod and the like. Preferably, we fasten to the shaft 45 between one or more of the tools or disks 46 drum sections 47 shown in Fig. 3, which when the apparatus is working in soft earth limit the depth to which the tools may enter the same, and prevent stalling the machine.

At the rear of the machine are arranged two gangs of cultivating and propelling tools 46ᵃ similar to the tools 46 before described. These gangs are carried respectively by frames 39ᵃ, which are in all essential particulars the same as the frames 39 (see Figs. 2 and 17). The frames 39ᵃ are pivotally mounted under the main frame of the apparatus by center pins and sockets 40ᵃ and king bolts 41ᵃ. 42ᵃ and 43ᵃ indicate fifth wheel sections similar to those before described for guiding the frames 39ᵃ in their turning movement on the main frame of the apparatus. Depending from the frames 39ᵃ are hangers 44ᵃ in which are mounted the axles 45ᵃ of the rear tools 46ᵃ. It, therefore, follows, that the main frame of the apparatus carries the two rear gangs of cultivating and propelling tools, which gangs are capable of adjustment on vertical axes, and that the auxiliary front frame is rockably carried by the main frame and in turn sustains the two front gangs of tools, so that those gangs may be adjusted the same as the rear gangs.

48 indicates the engine which furnishes the motive power for operating the apparatus, and which is mounted on the bed 35ᵍ as shown. This engine is preferably an internal combustion engine using oil as fuel, although other forms of power may be employed if desired.

49 indicates the fly wheel of the engine, and 50 indicates the transmission gearing which drives a chain 51, and which enables the speed and direction of movement of the chain to be changed at will without reversing the engine, all of which will be understood in the motor vehicle art. Said chain 51 drives a counter-shaft 52 which is suitably mounted in the central frame members 35ᶠ, and from this shaft a drive chain 53 passes forward and a drive chain 54 passes rearward. The forward chain 53 passes to a differential gear 55 connected to the shaft sections 56 (see Figs. 2 and 3). The shaft sections are mounted in the auxiliary front frame in suitable bearings provided therefor, and they are connected by two double universal joints 57 with shaft sections 58 mounted in bearings 59 sustained on the tool frames 39. Said universal joints 57 are so arranged that they will permit the tool frames 39 to turn on the auxiliary front frame without interfering with the transmission of rotary movement from the shafts 56 to the shafts 58. By providing double universal couplings having fixed vertical axis centrally located in line with axis 41, the angularity of the shaft axes at the coupling is decreased, with a consequent saving in power and without danger of breakage due to excessive strains and overheating. From the sprocket wheels on the shaft sections 58 driving chains 60 pass down to sprocket wheels on the shafts 45, so that in this manner the front tools are driven from the engine in either direction according to the adjustment of the transmission gearing 50. The chain 54 passes rearward to a differential gear 61 connecting the rear drive shaft sections 62 which are suitably mounted in the rear portion of the main frame of the apparatus. These shaft sections respectively extend over the pivots 40$^a$, connecting the tool frames 39$^a$ with the main frame, and at this point are provided with universal joints 63, similar to the joints 57 before described, these joints connecting the shaft sections 62 with shaft sections 64 suitably mounted on the tool frames (see Fig. 17). From sprockets on the shaft sections 64 chains 65 pass down to sprockets on the shafts 45$^a$ so as to drive the same. By these devices the rear cultivating tools are driven the same as the front, said tools having a rotary motion, and this drive being independent of the adjustment of the cultivating tools around the axes of the couplings 40 and 40$^a$.

The differential gears referred to above may be of any of the various types, such for instance as is shown in detail in Fig. 3. These gears serve to transmit to the gangs of disks equal driving motions, but to allow the disks to rotate independently from motion applied directly to them, for example by reason of some unevenness in the roadway or in the turning of the plow on a curve in which the outer gang must rotate faster than the inner gang. The differential gears in the arrangement shown are particularly useful owing to the use of gangs of disks engaging into the earth with little or practically no slippage, since otherwise the differential movements of the gangs of disks would exert the most destructive strains on the various elements concerned with driving the disks.

As will fully appear from our prior patent hereinbefore referred to, the steering of the apparatus is effected by varying the angularity of the shafts 45 and 45$^a$ to the longitudinal line of the machine. Our improved gear for so adjusting the cultivating tools will now be described. Revolubly mounted in suitable bearings on the central portion of the main frame (see Fig. 2) are two screw shafts 66 which, as best shown in Fig. 6, are each provided with right and left hand threads. On these threads nuts 67 operate, and said nuts are provided with forks 68 which embrace portions of the frame members 35$^t$ so as to prevent rotation of the nuts (see Figs. 7 and 8). Said nuts have links 69 connected thereto, and these links extend two forward and two backward respectively into pivotal connection with the tool frames 39 and 39$^a$ so that by rotating the shafts 66 the nuts 67 will be advanced along the shafts in one direction or the other, according to the direction of rotation of the shafts, and in this manner the tool frames with their connected tools will be turned around the centers of the pivots 40 and 40$^a$ adjusting the angularity of the tools, as will be understood from the prior art and as illustrated in Fig. 18.

The screw shafts 66 extend rearward to a point under the platform 35$^k$, and at this point they are connected with the manual and power steering gears. These gears are provided so that either one or the other may be used according to the conditions under which the machine is operated. If the work is light the apparatus may be steered by hand, and if the work is heavy and difficult, or the machines are being operated in multiple, it is preferable to steer by the power devices. The hand steering devices are illustrated best in Figs. 4 and 5. Suitably mounted in the platform 35$^k$ is a tubular shaft 70 through which a shaft 71 passes loosely. The shafts 70 and 71 carry hand wheels 72 and 73 respectively, and 74 indicates a dog by which said wheels may be connected to turn in unison, if desired. At the lower ends the shafts 70 and 71 respectively carry gears 75 and 76 which are in mesh with gears 77 and 78 carried respectively on shaft sections 79. The shaft sections 79 carry gears 80 which mesh with gears 81 fastened on the screw shafts 66. With this arrangement it is clear that by turning either of the hand wheels 72 or 73 either of the screw shafts 66 may be operated so as to adjust the gangs at one or the other side of the machine, as desired, or by throwing the dogs 74 into action and connecting the hand wheels, said wheels with the shafts 70 and 71 and gears 75 and 76 may be turned as a unit, thus operating both screw shafts simultaneously and bringing about simultaneous adjustment of all of the gangs of tools. In Figs. 1 and 2, we have shown hand wheels 72 and 73 and the shaft 70 in position. We have also illustrated in outline the gears connected therewith.

The power steering devices are illustrated best in Figs. 9 and 10. These devices comprise tubular and solid shafts 82 and 83 suitably mounted in the platform 35$^k$ and having arms or levers 84 and 85 connected to their upper ends so as to permit their operation independently or simultaneously, as desired. At their lower ends the shafts 82 and 83 are provided with crank arms 86, to which links 87 are pivoted. These links are reciprocated in guide hangers 88 and have forks 89 attached to them. 90 indicates springs which engage between the forks and guides 88 and which serve to hold the forks and their connected parts yieldingly in intermediate position. The forks 89 have pins engaged with grooved clutch collars 90$^a$ which are splined on a drive shaft 91. The clutch collars 90 are adapted to engage clutch faces on either of two gears 92 which are loosely mounted on the shaft 91 and meshed with gears 93 respectively on the screw shafts 66. The drive shaft 91 is adapted to be continuously driven in any suitable manner, for example, by a belt 94 passing around a band wheel 95 on the drive shaft, and extending from a suitable band wheel 96 on one of the rear drive shaft sections 62 (see Fig. 11).

As shown in Fig. 1, a canopy 97 is provided for the comfort of the operator, and for the protection of the machinery from the weather, and this is sustained by stanchions 98. If desired, the shafts 82 and 83 may be further braced by a cross member 98ª sustained by the rear stanchions 98. Said cross brace is illustrated in Fig. 9. It will be seen that by throwing either or both of the crank arms 86 the clutch collars 90 will be moved from their normal position into engagement with one or the other of the normally inactive gears 92, thus driving the desired gear 92 with the shaft 91 and operating the screw shafts 66 through the gears 93. In this way the shafts may be operated independently in either direction or simultaneously, the same as with the hand steering devices.

As shown in Figs. 1, 2 and 17, the main frame carries at its rear portion seed hoppers 114 which are provided with outlet spouts 115 discharging into drill tubes 116. These drill tubes have enlarged upper ends 116ª so that the adjustment of the rear cultivating tools will not interfere with the discharge of the seeds from the spouts 115 into the tubes 116 as said tubes 116 discharge the seed against the convex sides of the tools 46ª. In this manner seed may be planted from the apparatus at the same time that the ground is cultivated. The hoppers 141 are provided with the usual agitators (not shown), and these may be driven by a chain 117 (see Fig. 17) operating a clutch member 118 loosely mounted on the agitator shaft. 119 indicates a coacting clutch member fast on the shaft and engaged by a lever 120 facilitating the adjustment of the clutch member.

The apparatus is provided with spring harrow teeth 121, the same essentially as those disclosed in our prior patent above referred to, and having essentially the same function. Said teeth are mounted on a tubular rock shaft 122 in any suitable manner.

As shown in Fig. 2, the rock-shaft 122 is mounted on the side members 35 of the frame, and is provided with a hand lever and quadrant 123, by which the shaft may be rocked and the teeth raised or lowered into active or inactive position, as desired.

In working on rough or rocky land, it may be advantageous to employ springs or other yielding connections between the main frame and the supporting means, and the manner in which this may be effected is illustrated in Figs. 21 and 22. In said view 37 and 37ª indicate parts of the auxiliary or front frame, and 56 indicates the driving shaft sections thereof before described. 124 indicates a spider frame which is fastened on the auxiliary frame and carries securely a socket 125. In this socket telescopes a tubular stanchion 126 which rises from a bracket 127, the bracket projecting from a box 128, and said box and bearing carrying securely a non-rotatable cylindric covering 129. Revolubly mounted in the bearing 128 is a shaft 130 corresponding to the shaft 45 before described. This shaft carries brackets 131 to which drums 132 are secured, these drums being similar to the drums 47 before described and having rotating engagement with the ends of the non-rotary drum 129. To said drums 132 the cultivating and propelling tools 46 are fastened. Fastened to the shaft 130 is a gear 133, and this gear is in mesh with a gear 134 on a shaft 135, which extends through a tubular stanchion 136 and up through the socket 127. The upper end of the shaft 135 is held in a brace 124ª, and splined loosely on the shaft is a gear 136 in mesh with a gear 137 on the shaft 56. 138 indicates a stout coiled spring which surrounds the socket member 125 and stanchion 126, and bears between said parts so as yieldingly to sustain the frame and its attachment on the cultivating tools. By this arrangement not only is the frame spring sustained, but the tools may be adjusted by swinging them around the center of the shaft 135 without involving the necessity of the universal joint hereinbefore described.

If desired, rollers or cylindric shields 139 (see Figs. 19 and 20) may be applied to the drums 132 to convert the apparatus into a roller and to enable it to be transported from place to place when not plowing without injury to the roads or fields over which it is moving. Were these shields not employed, in transporting the plow over public or other roads, these roads would be so injured that use of the machine would be prohibited, and the shields are therefore quite necessary to the practical employment of our invention. These drums may be applied in any desired manner. As here shown they are provided with spiders 140 which embrace the drums 132, and said rollers 139 are constructed in sections, as indicated by the broken lines in Fig. 20, and fastened together by bolts 141. This allows the rollers 139 to be applied quickly and without necessitating the removal of the disks 46. Incidentally these shields may be employed to convert the apparatus into a roller, for rolling down plowed or otherwise broken ground.

As shown in Fig. 11, two or more of the machines may be coupled together so as to increase the work performed and for this purpose the side rails 35 of the main frames are offset at 35ª as before described. The machines are arranged side by side, and are connected together by links 142. These links are pivoted to said rails 35 and each link is formed in two sections, as shown best in Figs. 13 to 16, the sections of the links being joined by tubular coupling 143 and a nut 144, as shown. If desired, the machines may otherwise be entirely independent of each other, each being provided with its separate engine, or only one of the machines may be provided with an engine, the other machine being driven from this engine, in which case the machine having the engine is provided with a countershaft 145 mounted transversely in the frame just forward of the engine shaft and driven by a chain 146. This shaft is connected by a double universal joint 147 with a transverse shaft 148 arranged on the next adjacent machine in line with the shaft 145. The universal joints 147 are coincident to the pivots of the links 142, the shaft extending through the tubular coupling 143 of the forward pair of links 142. From said shaft 148 the chain 149 passes to a differential geared countershaft 52ª mounted on the second machine, and from this countershaft the machine is driven in the manner before described with reference to the countershaft 52. The second machine is steered from the first by means of chains 150 passing respectively from the screw shafts 66 and extending through the tubular coupling 144 of the rear pair of links, and connected respectively with the screw shafts 66 of the second machine. Mounted adjacent to the rear links 142 are guide rollers 151 which are engaged by the chain and are flanged, as shown in Figs. 12 and 13, so as to prevent the chains from running off the rollers.

In the organized operation of the apparatus, the engine should be started and the cultivating and propelling tools adjusted to the desired angularity with respect to the longitudinal line of the machine. The transmission mechanism 50 should now be thrown in, causing the tools to rotate, and the action of the tools simultaneously propelling the apparatus and cultivating the earth, as is fully set forth in our prior patent referred to. The apparatus may be steered at will through the hand wheels 72 and 73, or through the power steering mechanism as desired. If it be desired to plant seed at the same time that the plow is in operation, this may be done by throwing into action the clutch member 119 and otherwise adjusting the seeding devices, which devices may in themselves be of any desired form. The harrowing and cultivating teeth 121 may also be thrown in or out of action, as desired, and all these operations may be controlled from the seat of the driver. In case two or more machines are coupled together, as illustrated in Fig. 11, a single driver may have control of all of the machines, or if desired an attendant may be placed on the second machine to watch the operation thereof, and also to operate the harrowing and cultivating teeth 121. If desired said teeth may be connected together by a chain or its equivalent 153 (see Fig. 11). When two or more machines are used together it is preferable to employ the power steering gear, since in this way the steering operation is rendered less laborious.

Having thus described the preferred form of our invention, what we claim as new and desire to secure by Letters Patent is:

1. A motor driven agricultural apparatus, comprising a frame, a tool frame arranged to turn thereon, a tool carried by the tool frame, means for adjusting the tool from an engine mounted on the first named frame, and means for driving the tool from the engine, said means comprising a double universal joint juxtaposed to the center of turning movement of the tool frame.

2. In a motor driven agricultural apparatus, the combination of a main frame having an opening in the front thereof, an auxiliary front frame movably mounted in the said opening in substantially the plane of the main frame, combined cultivating and propelling tools attached to the rear part of the main frame and to the auxiliary front frame, and means for driving the said tools.

3. In a motor driven agricultural apparatus, the combination of a main frame having an opening in the front portion thereof, an auxiliary front frame pivotally mounted in said opening in substantially the plane of the main frame, cultivating tools mounted on the rear portion of the main frame, and additional tools mounted on the auxiliary front frame.

4. An agricultural apparatus having a main frame with an opening in the front portion thereof, an auxiliary front frame mounted in said opening in the main frame to rock freely around an axis extending longitudinally of the machine and located intermediate the sides of the auxiliary front frame, cultivating tools mounted to turn around substantially vertical axes at the rear portion of the main frame, additional cultivating tools mounted to turn around substantially vertical axes under the auxiliary front frame, and means for turning said tools.

5. An agricultural apparatus having a frame with an opening in the front portion thereof, an auxiliary front frame mounted in said opening in substantially the plane of the main frame, tool frames carried to turn at the rear portion of the main frame, tools carried by said tool frames, means for turning the frames, tool frames carried to turn by the auxiliary front frame, means for turning the second named tool frames, and tools carried by the second named tool frames.

6. An agricultural apparatus having a main frame with an opening in the front portion thereof, an auxiliary front frame arranged in said opening in substantially the plane of the main frame, a tool frame mounted to turn on the rear portion of the main frame, a tool carried by the tool frame, a tool frame mounted to turn on the auxiliary front frame, a tool carried by said tool frame, fifth wheel sections carried respectively by the main and auxiliary frames and the tool frames, and engaging each other for the purpose specified, and means for turning the tool frames.

7. An agricultural apparatus having a main frame with an opening therein, an auxiliary front frame mounted to lie in the opening in substantially the plane of the main frame and arranged to turn around axes extending longitudinally of the main frame, means for supporting the rear part of the main frame, tool frames mounted to turn under the side portions of the auxiliary front frame, tools carried by the tool frames, and means for turning the tool frames.

8. An agricultural apparatus having a main frame with an opening therein, an auxiliary front frame mounted to lie in the opening in substantially the plane of the main frame and to turn around axes extending longitudinally of the main frame, means for supporting the rear part of the main frame, tool frames mounted to turn under the side portions of the auxiliary front frame, tools carried by the tool frames, and means for turning the tool frames, the auxiliary front frame and tool frames having curved fifth wheel sections respectively connected therewith and engaging each other, for the purpose specified.

9. An agricultural apparatus having a main frame, an auxiliary front frame pivotally mounted thereon, two tool frames arranged to turn at the rear of the main frame, fifth wheel sections acting between said tool frames and the main frame, for the purpose specified, combined cultivating and propelling tools carried by the tool frames, two tool frames pivotally mounted on the auxiliary front frame, fifth wheel sections bearing between the tool frames and the auxiliary front frame, combined cultivating and propelling tools carried by the second named tool frame, an engine mounted on the main frame for driving all of said tools, and means for turning the tool frames.

10. An agricultural apparatus having combined propelling and cultivating tools arranged in two gangs, shaft sections connected with the respective gangs to drive them, a differential gear connecting the shaft sections, and means for imparting driving movement to said gear.

11. A motor driven agricultural apparatus comprising a frame, an engine mounted thereon, two tools mounted on the frame and engaging the ground, means for driving each tool, a differential gear connecting said means, and devices for driving said gear from the engine.

12. In a motor driven agricultural apparatus, the combination of a frame, two gangs of tools adapted to engage the earth, means for mounting said tools to turn on the frame, devices for driving said tools independently of the turning movement thereof, a differential gear connecting said devices, an engine, and means for driving the gear from the engine.

13. In a motor driven agricultural apparatus, the combination of a frame, two tool frames mounted to turn thereon, means for turning said frames, a tool carried by each frame and adapted to engage the earth, a means for driving each tool, a differential gear connecting said means, and an engine having connection with the differential gear.

14. A motor driven agricultural apparatus, the combination of a frame, a tool frame arranged to turn thereon, a tool carried by said frame, means for driving said tool, a screw shaft, a controllable means for rotating the same, a non-rotatable nut engaged by the screw shaft, and a connection between said nut and the tool frame.

15. In a motor driven agricultural apparatus, the combination of a frame, four tool frames arranged to turn thereon, a tool carried by each frame, an engine mounted on the main frame, means for driving said tools from the engine, screw shafts mounted on the main frame, non-rotatable nuts engaged by the screw shafts, links connecting said nuts respectively with the tool frames, and means for rotating the screw shafts.

16. In a motor driven agricultural apparatus, the combination of a frame, four tool frames arranged to turn thereon, a tool carried by each frame, an engine mounted on the main frame, means for driving said tools from the engine, screw shafts mounted on the main frame, non-rotatable nuts engaged by the screw shafts, links connecting said nuts respectively with the tool frames, and means for rotating the screw shafts, said means for operating the screw shafts comprising a tubular shaft, a shaft extending loosely through the same, a gear in connection with each of the last named shafts, and means respectively connecting said gears with the screw shafts.

17. In a motor driven agricultural apparatus, the combination of a frame, four tool frames arranged to turn thereon, a tool carried by each frame, an engine mounted on the main frame, means for driving said tools from the engine, screw shafts mounted on the main frame, non-rotatable nuts engaged by the screw shafts, links connecting said nuts respectively with the tool frames, a tubular shaft, a shaft extending loosely through the same, a gear in connection with each of the last named shafts, means respectively connecting said gears with the screw shafts, an additional shaft, means for driving the same from the engine, gears loose on said additional shaft, gears fastened to the screw shafts and meshed with the gears of the additional shaft, and means for fixing one or the other of the said gears on the additional shaft to said shaft at will.

18. In a motor driven agricultural apparatus, the combination with steering means including two rotary shafts, of a gear fixed to each shaft, gears meshed with opposite sides of each of said gears, a driving shaft on which the second named gears are loosely mounted, and means for fastening one or the other of said second named gears to the driven shaft at will.

19. In a motor driven agricultural apparatus, the combination with steering means including two rotary shafts, of a gear fixed to each shaft, gears meshed with opposite sides of each of said gears, a driving shaft on which the second named gears are loosely mounted, and means for fastening one or the other of said second named gears to the driven shaft at will, said means comprising clutch collars splined on the driven shaft, forks engaged with the clutch collars, rods in connection with the forks, a tubular shaft in connection with one rod, and an additional shaft extending loosely through the tubular shaft and having connection with the other rod.

20. In an agricultural apparatus, the combination of a main frame, two tool frames mounted to turn thereon, a threaded shaft, means for operating the same, nuts threaded on said shaft and having forks loosely engaging a part of the frame, and connections between said nuts and the tool frames.

21. The combination of a motor driven agricultural apparatus, a second agricultural apparatus adapted to be driven, means for connecting the second apparatus with the first apparatus, and devices for driving the tool of the second apparatus from the motor of the first apparatus.

22. The combination of a motor driven agricultural apparatus, a second agricultural apparatus, means for steering the second agricultural apparatus, means for steering the first apparatus, and a connection between the two steering means, for the purpose specified.

23. The combination of a motor driven agricultural apparatus, a second agricultural apparatus having connection therewith, means for steering the first apparatus, said means being driven by the engine thereof, means for steering the second apparatus, and a connection between the two steering means.

24. The combination of a motor driven agricultural apparatus, a second agricultural apparatus having connection therewith, a tool on the second apparatus, means having connection with the second apparatus to drive the tool of the second apparatus, means for steering the second apparatus, means for steering the first apparatus, the second named steering means being driven from the engine, and devices connecting the two steering means.

25. The combination of a motor driven agricultural apparatus, a second apparatus, links connecting the two, and means for driving the second apparatus from the engine of the first, said means including a universal joint coincident to the pivots of the links.

26. The combination of a motor driven agricultural apparatus, a second agricultural apparatus, means establishing pivotal connection between the two, and means for driving the second apparatus from the motor of the first, said means including a universal joint coincident to the pivot between the two apparatus.

27. The combination of two agricultural apparatus, a drive shaft extending between the same and having a double universal joint therein, links pivoted to the two apparatus, the pivots being coincident to the universal joints of the drive shaft, and a tubular coupling connecting sections of the links together through which couplings the drive shaft passes.

28. An agricultural apparatus having cultivating tools in two gangs, a differential gear, means for driving the same, and means connecting the differential gear with the said two gangs of cultivating tools.

29. An agricultural apparatus having two cultivating tools, a differential gear, means for driving the same, and means connecting the differential gear with the said two cultivating tools.

30. The combination of a motor driven agricultural apparatus, a second agricultural apparatus adapted to be driven, means for connecting the second apparatus to the first apparatus, and power transmitting devices extending from the first apparatus to the second apparatus to drive the same.

31. An agricultural apparatus having a frame, an engine, two tool frames transversely disposed, king-bolt connections between the tool and first named frames, fifth wheel devices acting between the first named or main frame and the tool frames, cultivating tools mounted on the tool frames, means for driving the cultivating tools of each tool frame such means including universal connections coincident to the king-bolts of the respective tool frames, a differential gear joining the means for driving the cultivating tools of each tool frame and a driving connection between the engine and differential gear.

32. An agricultural apparatus having a frame, an engine, two tool frames transversely disposed, king-bolt connections between the tool and first named frames, fifth wheel devices acting between the first named or main frame and the tool frames, cultivating tools mounted on the tool frames, means for driving the cultivating tools of each tool frame such means including universal connections coincident to the king-bolts of the respective tool frames, a differential gear joining the means for driving the cultivating tools of each tool frame a driving connection between the engine and differential gear and a steering mechanism connected to the tool frames for turning them around their king-bolts.

33. An agricultural apparatus having a frame, two tool frames, king-bolt connections between the tool frames and the first named or main frame, fifth wheel sections acting between the main and tool frames, an engine, a differential gear, a driving connection between the two, shaft sections mounted on the main frame and joined by the differential gear, shaft sections mounted on the tool frames, universal connections respectively coincident to the king-bolts and joining the shaft sections of the tool frames respectively with those of the main frame, and means for driving the cultivating tools from the shaft sections on the tool frames.

34. An agricultural apparatus having a frame, two tool frames, king-bolt connections between the tool frames and the first named or main frame, fifth wheel sections acting between the main and tool frames, an engine, a differential gear, a driving connection between the two, shaft sections mounted on the main frame and joined by the differential gear, shaft sections mounted on the tool frames, universal connections respectively coincident to the king-bolts and joining the shaft sections of the tool frames respectively with those of the main frame, and means for driving the cultivating tools from the shaft sections on the tool frame comprising sprocket and chain gearing extending from the shaft sections downward to the tools.

35. An agricultural apparatus having a frame, two tool frames, king-bolt connections between the tool frames and the first named or main frame, fifth wheel sections acting between the main and tool frames, an engine, a differential gear, a driving connection between the two, shaft sections mounted on the main frame and joined by the differential gear, shaft sections mounted on the tool frames, universal connections respectively coincident to the king-bolts and joining the shaft sections of the tool frames respectively with those of the main frame, means for driving the cultivating tools from the shaft sections on the tool frames, and steering devices connected to the tool frames to turn the same about their king-bolts.

36. An agricultural apparatus having a main frame, an auxiliary frame mounted to oscillate thereon, two cultivating tools mounted on the auxiliary frame, an engine on the main frame, means for transmitting driving motion to the cultivating tools such means mounted on the auxiliary frame and including a differential gear substantially coincident to the center of oscillation of the auxiliary frame, and a driving connection between the engine and the differential gear.

37. An agricultural apparatus having a main frame, an auxiliary frame mounted to oscillate thereon, two tool frames mounted to turn on the auxiliary frame, king-bolts pivotally connecting said tool frames with the auxiliary frame, cultivating tools carried by the tool frames, means at each tool frame for transmitting driving motion to the tools, such means including universal connections coincident to the respective king-bolts, a differential gear joining said means and located substantially coincident to the center of oscillation of the auxiliary frame, an engine on the main frame and a driving connection between the engine and differential gear.

38. An agricultural apparatus having a main frame, an auxiliary frame mounted to oscillate thereon, two tool frames mounted to turn on the auxiliary frame, king-bolts pivotally connecting said tool frames with the auxiliary frame, cultivating tools carried by the tool frames, means at each tool frame for transmitting driving motion to the tools, such means including universal connections coincident to the respective king-bolts, a differential gear joining said means and located substantially coincident to the center of oscillation of the auxiliary frame, an engine on the main frame, a driving connection between the engine and differential gear and a steering means connected to the tool frames to steer the same.

39. The combination of two connected self-propelling cultivating apparatus, an engine on one to drive it and a motion transmitting means driven by the engine and extending to the other apparatus to drive it also.

40. The combination of two self propelling cultivating apparatus, an engine on one to drive it and a motion transmitting means driven by the engine and extending to the other apparatus to drive it also.

41. The combination of two pivotally connected self propelling cultivating apparatus, an engine on one to drive it and a motion transmitting means driven by the engine and extending to the other apparatus to drive it also.

42. The combination of two pivotally connected self propelling cultivating apparatus, an engine on one to drive it and a motion transmitting means driven by the engine and extending to the other apparatus to drive it also said means having a universal joint coincident to the pivotal connection between the two apparatus.

43. The combination of two self propelling cultivating apparatus, an engine on one to drive it, a motion transmitting means driven by the engine and extending to the other apparatus to drive it also, and a link the ends of which are pivoted respectively to the apparatus to connect them together, said motion transmitting means having a double universal joint the parts of which are respectively coincident to the pivots at the ends of the links.

44. A motor plow comprising a main frame, an auxiliary frame, extending transversely thereof, means connecting said frames at a point intermediate the ends of the auxiliary frame, two gangs of disks, means for adjustably mounting them respectively on the end portions of the auxiliary frame, means for adjusting the said disks, a motor, a differential gear, shaft sections driven therefrom, shaft sections mounted to move with the adjusting movement of said gangs of disks, gearing connecting the second named shaft sections respectively with the gangs of disks and universal connections joining the first named shaft sections with the second.

45. A motor plow having a frame, propelling and cultivating tools mounted thereon and adjustable to regulate the plowing action, a rotary member mounted on the frame and adjustable to steer the plow, trains of gearing for effecting such adjustments, concentric shafts respectively connected with said trains of gearing and means for independently rotating the shafts.

46. A motor plow having a main frame, an auxiliary frame connected thereto, a tool frame mounted on the auxiliary frame by a vertical pivot, a tool carried by the tool frame, a motor mounted on the main frame, a shaft section revolubly mounted on the auxiliary frame, gearing connecting the motor with the shaft section, a shaft section rotatably mounted on the tool frame, gearing connecting the second shaft section with the cultivating tool, and a universal connection between the two shaft sections.

47. In a motor plow, the combination of a main frame, an auxiliary frame mounted thereon intermediate its ends, a tool frame connected to each end portion of the auxiliary frame by means of a vertical pivot, a tool carried on each tool frame, an engine mounted on the main frame, shaft sections rotatably mounted on the auxiliary frame, a differential gear connecting the shaft sections, gearing connecting the differential gear and motor, shaft sections revolubly mounted on the tool frames, gearing connecting the shaft sections respectively with the tools, and universal connections joining the first named shaft sections respectively with the second named shaft sections coincident to the centers of pivotal movement of the tool frames.

In testimony whereof we have signed our names to this specification in the presence of two subscribing witnesses.

ALBERT E. COOK.
SAMUEL ELLSWORTH KURTZ.

Witnesses:
R. W. SAYRE,
S. BEN SAYRE.